(12) United States Patent
Rios et al.

(10) Patent No.: US 9,213,515 B2
(45) Date of Patent: Dec. 15, 2015

(54) ON-DEMAND MULTI-SCREEN COMPUTING

(71) Applicant: AT&T Intellectual Property I, L.P., Atlanta, GA (US)

(72) Inventors: Roque Rios, Haskell, NJ (US); James Gordon Beattie, Jr., Bergenfield, NJ (US); Soumyajit Chakraborty, Harrison, NJ (US); Stephen J. Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 200 days.

(21) Appl. No.: 13/625,471

(22) Filed: Sep. 24, 2012

(65) Prior Publication Data

US 2014/0089821 A1 Mar. 27, 2014

(51) Int. Cl.
 *G06F 3/0482* (2013.01)
 *G06F 3/14* (2006.01)
(52) U.S. Cl.
 CPC ............... *G06F 3/14* (2013.01); *G06F 3/0482* (2013.01)
(58) Field of Classification Search
 CPC ............................ G06F 3/1423; G06F 3/0482
 USPC ......................................................... 715/761
 See application file for complete search history.

(56) References Cited

U.S. PATENT DOCUMENTS

| | | | | |
|---|---|---|---|---|
| 6,272,545 | B1 * | 8/2001 | Flanagin et al. | 709/228 |
| 7,475,419 | B1 * | 1/2009 | Basu et al. | 726/2 |
| 8,296,728 | B1 * | 10/2012 | Webster | 717/109 |
| 2005/0091302 | A1 * | 4/2005 | Soin et al. | 709/200 |
| 2005/0091359 | A1 * | 4/2005 | Soin et al. | 709/223 |
| 2007/0171921 | A1 * | 7/2007 | Wookey et al. | 370/401 |
| 2007/0244967 | A1 * | 10/2007 | Ben-Shachar et al. | 709/204 |
| 2007/0296643 | A1 * | 12/2007 | Ben-Shachar et al. | 345/1.1 |
| 2008/0201751 | A1 * | 8/2008 | Ahmed et al. | 725/109 |
| 2008/0313545 | A1 * | 12/2008 | Patel et al. | 715/738 |
| 2009/0249219 | A1 * | 10/2009 | Best et al. | 715/748 |
| 2010/0138780 | A1 * | 6/2010 | Marano et al. | 715/804 |
| 2010/0299436 | A1 * | 11/2010 | Khalid et al. | 709/226 |
| 2011/0009166 | A1 | 1/2011 | Noh et al. | |
| 2011/0231280 | A1 * | 9/2011 | Farah | 705/26.8 |
| 2011/0246904 | A1 * | 10/2011 | Pinto et al. | 715/740 |
| 2012/0136925 | A1 * | 5/2012 | Horiuchi et al. | 709/203 |
| 2012/0151369 | A1 * | 6/2012 | Kominac et al. | 715/740 |
| 2012/0262379 | A1 * | 10/2012 | King | 345/173 |
| 2012/0272317 | A1 * | 10/2012 | Rubin et al. | 726/23 |
| 2013/0041938 | A1 * | 2/2013 | Lin | 709/203 |

(Continued)

OTHER PUBLICATIONS

Warnerwhiteside, "Citrix XenDesktop, Real World Use Cases", uploaded Mar. 21, 2011, https://www.youtube.com/watch?v=woyhUCzs7rc.*

(Continued)

*Primary Examiner* — Reza Nabi
*Assistant Examiner* — Daniel Rodriguez
(74) *Attorney, Agent, or Firm* — Hartman & Citrin LLC

(57) ABSTRACT

Concepts and technologies disclosed herein are for on-demand multi-screen computing. According to one aspect disclosed herein, a method for multi-screen computing includes establishing a multi-screen computing session, establishing communication with a primary computing device and an auxiliary device to be included in the multi-screen computing session, creating a web container for the auxiliary device, and propagating the web container to the auxiliary device for presentation on a display of the auxiliary device.

18 Claims, 14 Drawing Sheets

(56) References Cited

U.S. PATENT DOCUMENTS

2013/0050275 A1* 2/2013 Miyamoto et al. ............ 345/672
2013/0214995 A1* 8/2013 Lewin et al. ................... 345/1.3

OTHER PUBLICATIONS

How-to Geek, "How to Use Your iPad as a Second Monitor for Your PC or Mac", Dec. 24, 2011, http://www.howtogeek.com/100886/how-to-use-your-ipad-as-a-second-monitor-for-your-pc-or-mac/.*
Microsoft, "Dual monitor setup: Two monitors are better than one" [www.microsoft.com/athome/organization/twomonitors.aspx#fbid=7bLKSWILFxo] accessed Aug. 27, 2012.
iDisplay for Android, update v 2.3.4, Turn your Android device into the second monitor for your Mac or Windows PC! [www.shape.ag/en/products/details.php?product=idisplay&platform=android] accessed Aug. 22, 2012.
iDisplay for iPad and iPhone, v. 2.4.7, Turn your iPad/iPhone into the second monitor for your Mac or Windows PC! [www.shape.ag/en/products/details.php?product=idisplay&platform=iphone] accessed Aug. 22, 2012.
Herrman, J., "Review: iDisplay Turns Your iPad into a Second Monitor," Apr. 3, 2010 [www.gizmodo.com/5508816/review-idisplay-turns-your-ipad-into-a-second-monitor].
Xbox, "Xbox SmartGlass" [www.xbox.com/en-US/live/smartglass] accessed Aug. 22, 2012.

* cited by examiner

ON-DEMAND MULTI-SCREEN COMPUTING

TECHNICAL FIELD

The concepts and technologies disclosed herein generally relate to multi-screen computing. More specifically, the concepts and technologies disclosed herein relate to on-demand multi-screen computing.

BACKGROUND

Many computer systems rely on a single monitor. A monitor may be attached to a computer system using a display interface cable, or may be built-in to the computer system in systems such as laptops, tablets, ultrabooks, and all-in-one computers. In an effort to increase productivity, many users seek multi-monitor configurations for their computers. In some scenarios, a user connects two monitors to a single computer system and chooses to mirror the content displayed thereon or to extend the total screen area to traverse both monitors. The latter approach is commonly referred to as "extended desktop." For some users, even two monitors are not enough, so three or more monitors are used to further extend their desktop real estate. Complicated hardware setup with multiple wires, which may utilize multiple display interface technologies, along with buggy software, render multi-monitor configurations cumbersome to implement for many but the most advanced users. Moreover, for some users, additional screen real estate is only needed from time to time, so the additional cost associated with a multi-monitor configuration is not financially sensible. Although some monitors offer high resolutions such as Wide Quad High Resolution ("WQHD"), these monitors are very expensive for many home and business users.

SUMMARY

Concepts and technologies are described herein for on-demand multi-screen computing. According to one aspect disclosed herein, a method for multi-screen computing includes establishing a multi-screen computing session, establishing communication with a primary computing device and an auxiliary device to be included in the multi-screen computing session, creating a web container for the auxiliary device, and propagating the web container to the auxiliary device for presentation on a display of the auxiliary device.

In some embodiments, the method also includes presenting a multi-screen configuration user interface for defining a multi-screen configuration for use during the multi-screen computing session, receiving a configuration input via the multi-screen configuration user interface, and updating the multi-screen configuration based upon the configuration input. The configuration input may include a definition of a first screen as being associated with the primary computing device and a second screen as being associated with the auxiliary device, an arrangement of the first screen and the second screen within the multi-screen configuration, and/or an assignment of a layout to the first screen and the second screen.

In some embodiments, the method also includes building a virtual copy of the primary computing device, causing the auxiliary device to use the virtual copy to access content from the primary computing device, receiving a change that is input via the auxiliary device, and updating the primary computing device and the virtual copy to reflect the change.

In some embodiments, the method also includes receiving an input to move an object from a source screen associated with the primary computing device to a destination screen associated with the auxiliary device, and moving the object to the web container in response to receiving the input.

In some embodiments, the method also includes receiving an input via the auxiliary device, and emulating the input on the primary computing device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
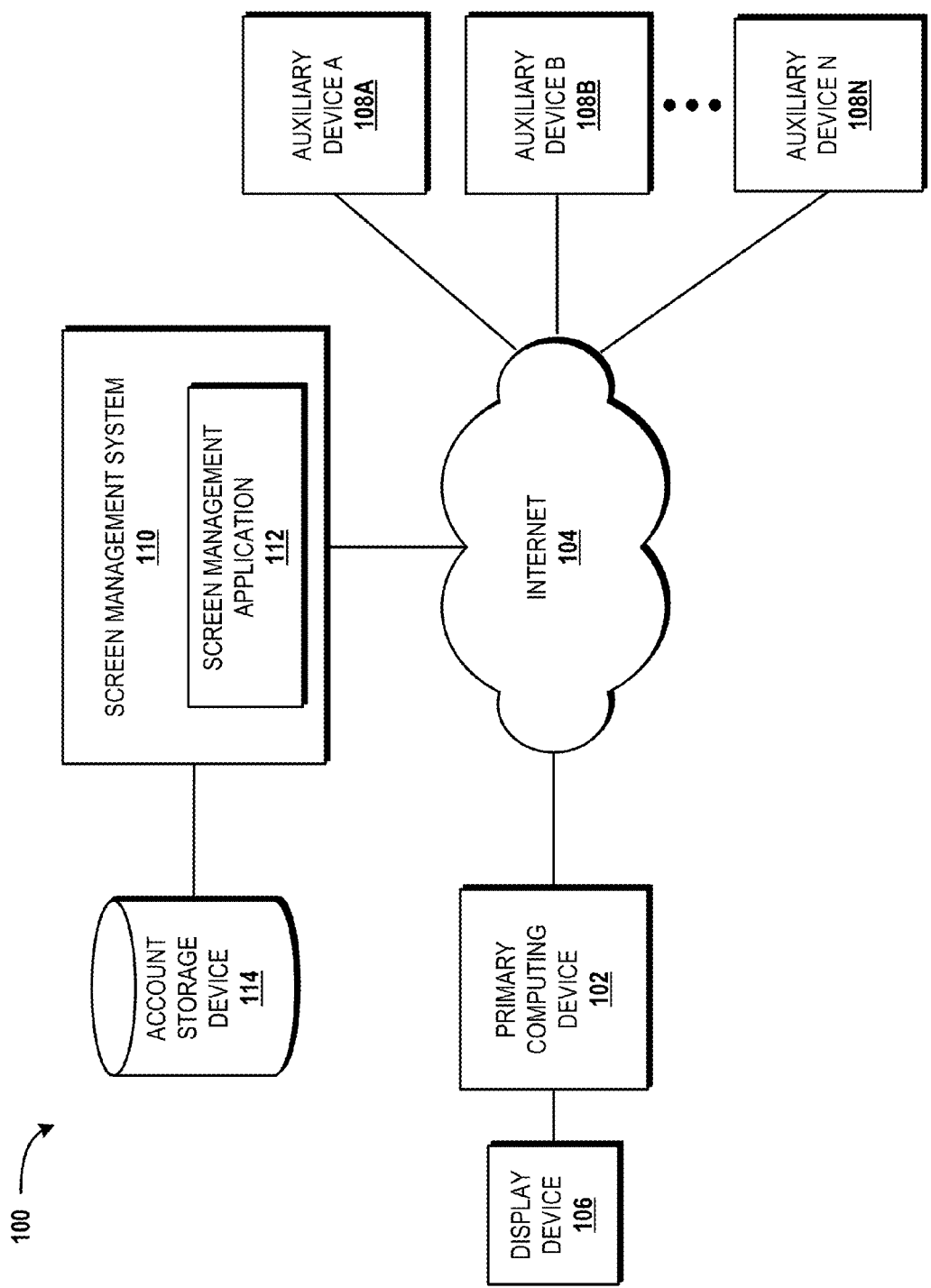
FIG. 1 is a block diagram illustrating aspects of an illustrative operating environment for various concepts disclosed herein.

While the subject matter described herein may be presented, at times, in the general context of program modules that execute in conjunction with the execution of an operating system and applications on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of on-demand multi-screen computing will be presented. As used herein, "on-demand" refers to making computing resources available to a user as needed.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 may be available without departing from illustrative embodiments described herein.

The operating environment 100 shown in FIG. 1 includes a primary computing device 102 that is in communication with an internet 104, such as the Internet. In some embodiments, the primary computing device 102 is a desktop computer, an all-in-one computer, a laptop computer, a notebook computer, a netbook computer, an ultrabook computer, a tablet computer, a smartphone, a personal digital assistant ("PDA"), a video game console, a handheld video game console, a smart television (i.e., a television with Internet connectivity), a set-top box (e.g., a cable, satellite, and/or DVR system), or the like.

The primary computing device 102, in the illustrated embodiment, is in communication with a display device 106. The display device 106 is configured to present content in a visual manner. In some embodiments, the display device 106 is a computer monitor, a projector, a television, or other display that utilizes a display interface technology such as, but not limited to, Video Graphics Array ("VGA"), Digital Visual Interface ("DVI"), High-Definition Multimedia Interface ("HDMI"), or DisplayPort, to receive visual content from the primary computing device 102 for presentation. Other existing and future display interface technologies are contemplated, as are wireless display interface technologies. In some other embodiments, the display device 106 is built-in to the primary computing device 102, such as embodiments in which the primary computing device 102 is a tablet computer, a laptop computer, a notebook computer, a netbook computer, an ultrabook computer, a smartphone, an all-in-one computer, or any other computing device that has a built-in display device. In any case, the display device 106 is configured to visually present content such as, but not limited to, Graphical User Interface ("GUI") elements, text, images, video, notifications, software buttons, software keyboards, Internet content, device status, time, date, calendar information, preferences, map information, location information, and/or any other information that is capable of being presented in visual form.

From time to time, a user (not shown) of the primary computing device 102 may want or need additional area in which to view visual content presented to the display device 106 based upon one or more operations performed at least in part by the primary computing device 102. For instance, a user may cause the primary computing device 102 to launch a first application program and a second application program, and may want to present the first application program in a maximized window or full-screen mode so as to utilize the majority of the presentation area provided by the display device 106. In doing so, however, the second application program would typically be forced to the background, thus requiring the user to toggle between the first application program and the second application program. In accordance with some aspects disclosed herein, the user can configure one or more auxiliary devices 108A-108N to access the primary computing device 102 so as to provide presentation area in addition to the presentation area provided by the display device 106. In this manner, the user can add additional presentation area on-demand to perform various computing tasks using the primary computing device 102. A single auxiliary device 108 is referred to herein below for ease of explanation and not limitation.

The auxiliary device 108 includes a display capable of presenting content received from the primary computing device 102. In some embodiments, the auxiliary device 108 is a computer monitor, a projector, a television, or other display device that utilizes a display interface technology such as, but not limited to, VGA, DVI, HDMI, or DisplayPort, to receive visual content from the primary computing device 102 for presentation. The auxiliary device 108 may utilize other existing and/or future display interface technologies including, but not limited to, wireless display interface technologies. In some other embodiments, the auxiliary device 108 is a computing device such as, but not limited to, a desktop computer, an all-in-one computer, a laptop computer, a notebook computer, a netbook computer, an ultrabook computer, a tablet computer, a smartphone, a PDA, a video game console, a handheld video game console, a smart television (i.e., a television with Internet connectivity), a set-top box (e.g., a cable, satellite, and/or DVR system), or the like. In these embodiments, the auxiliary device 108 may provide input functionality to perform operations locally on the auxiliary device 108. For example, the auxiliary device 108 may be a smartphone that includes a touchscreen configured to detect the presence and/or location of a touch and to utilize such detection as input for use by an application program executing on the auxiliary device 108. Also in these embodiments, the auxiliary device 108 may provide input functionality to the primary computing device 102. In this manner, visual content received from the primary computing device 102 can be presented on the display device 106 and the auxiliary device 108, and input received via the auxiliary device 108 can be used as input to an application program executing on the primary computing device 102.

In some embodiments, the auxiliary device 108 includes one or more built-in input devices such as, for example, a touchscreen, a mouse, a keyboard, a keypad, a track ball, a track pad, a biometric reader (e.g., a fingerprint reader or a retinal scanner), a still camera, a video camera, a microphone, and/or other input device that is built-in to the auxiliary device 108. In some embodiments, the auxiliary device 108 is in communication with an input device such as any of the above devices that are external to and in communication with the auxiliary device 108 via a wired or wireless connection. The primary computing device 102 may likewise include built-in and/or external input devices that a user may use to provide input to the primary computing device 102 in addition to or as an alternative to input provided via the auxiliary device 108.

Input received via input devices can include, but is not limited to, any visual, aural, tactile, biological, chemical, biochemical, radiological, or location input. Visual input, for example, may be received by the primary computing device 102 via a still camera or video camera built-in to or otherwise in communication with the primary computing device 102 and/or the auxiliary device 108. Aural input, for example, may be received by the primary computing device 102 via a microphone built-in to or otherwise in communication with the primary computing device 102 and/or the auxiliary device 108. Tactile input, for example, may be received by the primary computing device 102 via a touchscreen configured to detect one or more discrete touches, single touch gestures, and/or multi-touch gestures. Biological input, for example, may be received by the primary computing device 102 via a biometric sensor. Chemical input, for example, may be received by the primary computing device 102 via a chemical sensor. Biochemical input, for example, may be received by the primary computing device 102 via biochemical sensor. Radiological input, for example, may be received by the primary computing device 102 via a radiological sensor. Location input, for example, may be received by the primary computing device 102 via a Global Positioning System ("GPS") sensor and/or through one or more WIFI and/or cellular transceivers via triangulation techniques. Other sensors such as magnetometers, ambient light sensors, proximity sensors, accelerometers, gyroscopes, temperature sensors, shock detection sensors, and the like are contemplated for use in providing input to the primary computing device 102.

The auxiliary device 108 and/or the display device 106 can present content received from the primary computing device 102 in various layouts including, but not limited to, an extended layout, a mirrored layout, an application specific layout, and a stream layout. Other layouts including, for example, user-customizable layouts are contemplated.

An extended layout provides an extension of the presentation area provided by the display device 106 to the auxiliary device 108, or vice versa. In this manner, for example, the auxiliary device 108 may be utilized at least in part to provide an "extended desktop" user experience whereby the user can arrange visual content between the display device 106 and the auxiliary device 108 as if the presentation area provided by the display device 106 and the auxiliary device 108 were provided by a single display device. Other use cases for an extended layout are contemplated.

A mirrored layout allows for visual content displayed on the display device 106 to be mirrored on the auxiliary device 108, or vice versa. In this manner, for example, a user of the primary computing device 102 may cause the display device 106 to present content locally so as to be viewable by the user, and may also cause the auxiliary device 108 to present the same content remotely so as to be viewable by the same user or another user. Other use cases for a mirrored layout are contemplated.

An application specific layout allows a user to assign one or more applications to the display device 106 and/or to the auxiliary device 108 such that when an application is launched, visual content associated with the application is presented on the device to which the application is assigned. In this manner, for example, a user may assign a word processing application to open on the display device 106 and an instant messaging application to open on the auxiliary device 108. Other use cases for the application specific layout are contemplated.

A stream layout allows a user to view a virtual copy of an application running on the primary computing device 102. Alternatively, a stream layout may allow a user to view a feed from a specified source such as, but not limited to, a television, a set-top box, another computing device, or a camera.

It should be understood that the auxiliary device 108 is not limited to presenting content received from the primary computing device 102 in a visual manner. In some implementations, the auxiliary device 108, in addition to or as an alternative to presenting visual content, presents audio content through one or more speakers of the auxiliary device 108. Other content such as haptic feedback or generally any content that can be experienced by one or more of a user's five senses—sight, hearing, touch, smell, and taste—can be presented by the auxiliary device 108.

In the illustrated embodiment, the primary computing device 102 and the auxiliary device 108 are in communication via the internet 104. In some embodiments, the primary computing device 102 and the auxiliary device 108 are each in communication with one or more other networks that facilitate a connection to the internet 104. Other networks may include, but are not limited to, one or more local area networks ("LANs"), campus area network ("CANs"), metropolitan area network ("MANs"), and/or wide area network ("WANs"). In some embodiments, the primary computing device 102 and the auxiliary device 108 are in communication with each other via a network such as, but not limited to, a near field communications ("NFC") network, a body area network ("BAN"), a personal area network ("PAN"), a near-me area network ("NAN"), a LAN, and/or an ad-hoc LAN network. Any of the aforementioned networks may be in communication with one or more Internet service provider ("ISP") networks and/or backbone networks to facilitate connections to the internet 104. Moreover, any of the aforementioned networks may utilize wired and/or wireless connections to facilitate communications to and/or from the primary computing device 102 and/or the auxiliary device 108.

In some embodiments, access to the internet 104 is provided in part via one or more wireless LANs ("WLANs") that are configured to operate in accordance with one or more Institute of Electrical and Electronic Engineers ("IEEE") 802.11 standards, such as IEEE 802.11a, 802.11b, 802.11g, 802.11n, and/or future 802.11 standards (referred to herein collectively as WI-FI). Draft 802.11 standards are also contemplated. In some embodiments, a WLAN is implemented utilizing one or more wireless WI-FI access points. In these embodiments, one or more of the wireless WI-FI access points may be another computing device, such as a cellular telephone, smartphone, computer, or tablet, that is functioning as a WI-FI hotspot, and that has connectivity to a wireless WAN ("WWAN"), such as provided by a radio access network ("RAN") and a core network. Connections to the WLAN may be secured via various encryption technologies including, but not limited to, WI-FI Protected Access ("WPA"), WPA2, or Wired Equivalent Privacy ("WEP").

In some embodiments, the primary computing device 102 and/or the auxiliary device 108 are configured to wirelessly communicate with one or more RANs that provide access to one or more WWANs such as one or more mobile telecommunications networks operating in accordance with one or more mobile telecommunications technologies that may include, but are not limited to, Global System for Mobile communications ("GSM"), Code Division Multiple Access ("CDMA") ONE, CDMA2000, Universal Mobile Telecommunications System ("UMTS"), Long-term Evolution ("LTE"), Worldwide Interoperability for Microwave Access ("WiMAX"), or other 802.XX technologies. Moreover, the mobile telecommunications network(s) may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), or Space Division Multiple Access ("SDMA"), to provide access to a core network, which may include a circuit-switched core network ("CS CN"), a packet-switched core network ("PS CN"), and/or an IP multimedia subsystem ("IMS") core network. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

For ease of explanation, a presentation area provided by a display is referred to hereinafter as a "screen." For example, a presentation area provided by the display device 106 may be referred to as a first screen, while a presentation area provided by a display of the auxiliary device 108 may be referred to as a second screen. By way of further example, if the auxiliary device 108 includes multiple displays, or if the primary computing device 102 is connected to the display device 106 and an additional display device, each additional display associated with either the primary computing device 102 or the auxiliary device 108 provides a presentation area that is considered an additional screen. In some embodiments, a presentation area provided by a single display is divided into multiple presentation areas, each of which is a screen. In the illustrated embodiment, the display device 106 and the auxiliary device 108 each provide screens that together constitute a multi-screen configuration. As will now be described, a user may configure the primary computing device 102, the display device 106, and the auxiliary device 108 as devices for use in a multi-screen configuration via a screen management system 110.

The screen management system 110 is configured to execute a screen management application 112 to perform various operations described herein with regard to setting up a screen management account, managing the screen management account, configuring devices for use during a multi-screen computing session, configuring screen layouts on the devices, synchronizing the devices, viewing device details, scheduling events for the devices, and providing on-demand multi-screen computing sessions. In some embodiments, the screen management system 110 executes the screen management application 112 to provide a virtualization environment in which a virtual copy of the primary computing device 102 can be created and application(s) and/or data contained within that virtual copy can be viewed, and in some instances manipulated, via one or more screens made viewable by physical displays of devices such as the display device 106 and the auxiliary device 108 that are in communication with the screen management system 110. In some embodiments, the screen management system 110 executes the screen management application 112 to provide an interface through which a user can create a screen management account, manage the screen management account, configure devices, configure screen layouts on those devices, synchronize devices, view device details, schedule events for devices, and/or perform other tasks described herein. Alternatively, the interface may be provided for the screen management system 110 by another system such as a web server configured to host a web page containing the interface. A user may access the interface via a dedicated application or a web browser executing on a device such as the primary computing device 102.

The illustrated screen management system 110 is in communication with an account storage device 114 that is configured to store one or more screen management accounts. A screen management account includes information associated with one or more account users and the devices that can be utilized by the user(s) during on-demand multi-screen computing sessions provided by the screen management system 110. In some embodiments, a screen management account is associated with a free, pay-per-use, or subscription-based on-demand multi-screen computing service. Additional details regarding screen management accounts are described herein below with reference to FIG. 6G.

Illustrative methods regarding some of the aforementioned aspects of the screen management system 110 are illustrated and described with reference to FIGS. 2-5. An illustrative user interface is illustrated and described with reference to FIGS. 6A-6G.

Figure 2:
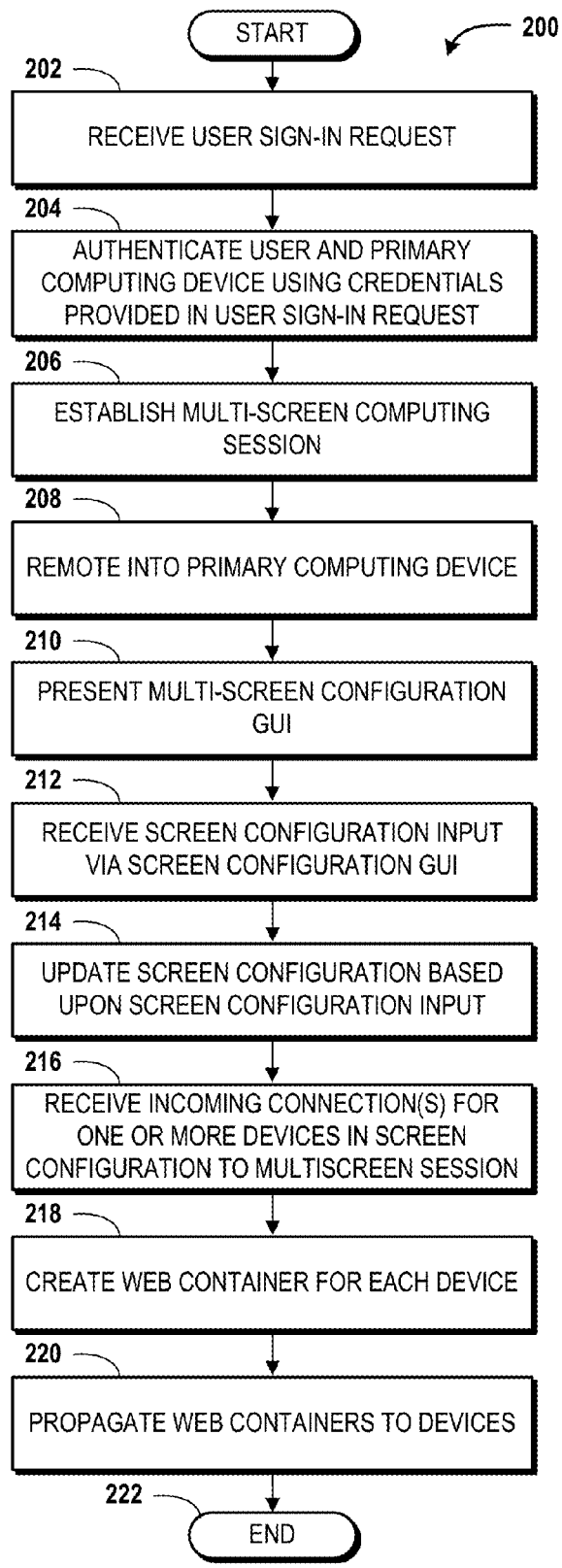
FIG. 2 is a flow diagram illustrating aspects of a method for setting up an on-demand multi-screen configuration, according to an illustrative embodiment.

Turning now to FIG. 2, a flow diagram illustrating aspects of a method 200 for setting up an on-demand multi-screen configuration will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer storage media, as defined below. The term "computer-executable instructions," and variants thereof, as used in the description and claims, is used expansively herein to include routines, applications, software, application modules, program modules, programs, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. As used herein, "cause a processor to perform operations" includes causing the processor to perform one or more operations of the operations and/or causing the processor to direct other instrumentalities to perform one or more of the operations.

The method 200 is described with additional reference to FIG. 1. In particular, the method 200 is described from the perspective of the screen management system 110 that has access to a screen management account associated with a user of the primary computing device 102 who wants to also utilize a display of the auxiliary device 108 as an extra screen for computing tasks performed via the primary computing device 102. Accordingly, it is assumed that the user's screen management account has been created prior to performance of the method 200.

The method 200 begins and proceeds to operation 202, wherein the screen management system 110 receives a user sign-in request. In some embodiments, the user sign-in request includes user authentication credentials such as a user identifier ("user ID") and a password. In some embodiments, the user sign-in request includes device authentication credentials such as a device identifier ("device ID"). The device ID can be an international mobile equipment identity ("IMEI"), a universally unique identifier ("UUID"), an international mobile subscriber identity ("IMSI"), a temporary IMSI ("T-IMSI"), a hardware ID such as a Media Access Control ("MAC") address, a telephone number associated with the primary computing device 102, any combination thereof, and the like. Authentication schemes, including, but not limited to, authentication schemes that employ multi-factor authentication utilizing something one has, something one is, something one knows, something one has done, and/or somewhere one is located, are also contemplated as user authentication credentials for use in a user sign-in request directed to the screen management system 110.

In some embodiments, the user sign-in request is received by the screen management system 110 via an application program executing on the primary computing device 102. For instance, a screen management application program installed on the primary computing device 102 can be used to receive input of authentication credentials (e.g., through a GUI) and, in response, generate the user sign-in request directed to the screen management system 110. In some other embodiments, the user sign-in request is received via a web application, web page, or other web-based user interface through which a user can provide authentication credentials. In these embodiments, the web application, web page, or other web-based user interface can be hosted by and/or for the screen management system 110.

If the screen management system 110 cannot authenticate the user and the primary computing device 102 at operation 204, the method 200 may end with or without the screen management system 110 notifying the user of the failed user sign-in request. If, however, the screen management system 110 can authenticate the user and the primary computing device 102, the method 200 proceeds to operation 204, wherein the screen management system 110 authenticates the user and the primary computing device 102 using the authentication credentials provided in the user sign-in request. Other embodiments in which only user authentication credentials are used for authentication, only device authentication credentials are used for authentication, or no authentication credentials are used are also contemplated.

From operation 204, the method 200 proceeds to operation 206, wherein the screen management system 110 establishes a multi-screen computing session for the user's screen management account. At operation 208, the screen management system 110 remotes into the primary computing device 102 thereby establishing communication with the primary computing device 102 via the multi-screen computing session. At this point, the multi-screen computing session includes a screen associated with the display device 106. Although the primary computing device 102 is described as having the display device 106 connected thereto, the primary computing device 102 may, in some implementations, have multiple display devices connected thereto and, as a result, the multi-screen computing session may include screens associated with each display device.

From operation 208, the method 200 proceeds to operation 210, wherein the screen management system 110 presents a multi-screen configuration GUI to the multi-screen session. This causes the display device 106 to present the multi-screen configuration GUI to the user. The multi-screen configuration GUI provides a user interface through which the user can define and manage one or more multi-screen configurations. For ease of explanation, it is assumed that the user is using a single multi-screen configuration. The multi-screen configuration GUI allows a user to configure multiple screens for use during the current multi-screen computing session and, in some embodiments, one or more future multi-screen computing sessions. In some embodiments, the multi-screen configuration GUI allows a user to create a new multi-screen configuration, or to select a previously created or default multi-screen configuration for use during a multi-screen computing session.

From operation 210, the method 200 proceeds to operation 212, wherein the screen management system 110 receives a multi-screen configuration input via the multi-screen configuration GUI. At operation 214, the screen management system 110 updates the multi-screen configuration based upon the multi-screen configuration input. For instance, the multi-screen configuration input may define a screen provided by the auxiliary device 108 as a screen to be used within multi-screen computing sessions that utilize this multi-screen configuration. At this point, the multi-screen computing session includes a first screen associated with the display device 106 and a second screen associated with the auxiliary device 108.

The multi-screen configuration input can include an arrangement of available screens within the multi-screen configuration for the multi-screen computing session. In the above example, the multi-screen configuration input can include the arrangement of the first screen that is associated with the display device 106 in relation to the second screen that is associated with the auxiliary device 108. In addition or in the alternative, the multi-screen configuration input can include the assignment of a layout to the screens in the multi-screen configuration. As explained above, for example, a screen can be assigned an extended layout, a mirrored layout, an application specific layout, or a user-customized layout.

From operation 214, the method 200 proceeds to operation 216, wherein the screen management system 110 receives an incoming connection for one or more devices in the multi-screen configuration to the multi-screen computing session. In some embodiments, the screen management system 110 sends a message to one or more devices included in the multi-screen configuration to wake-up the device(s) for the multi-screen computing session. In some other embodiments, the user provides an input via one or more devices included in the multi-screen configuration to initiate establishment of the connection to the screen management system 110.

Although a multi-screen configuration can define multiple devices for use as screens, it is not necessary for each device to always be utilized in a given multi-screen computing session that utilizes the multi-screen configuration. In other words, if a user has a monitor, a smartphone, and a tablet as devices in a multi-screen configuration, and the user signs in to his or her account to begin a multi-screen computing session, the user can decide to utilize only the monitor and smartphone, only the monitor and tablet, or smartphone and tablet, for example.

From operation 216, the method 200 proceeds to operation 218, wherein the screen management system 110 creates a web container for each device that is connected to the multi-screen session. As used herein, a web container is a data structure that is configured to store a copy of content associated with the primary computing device 102 for use during a multi-screen session. In some embodiments, the content associated with the primary computing device 102 includes visual content associated with the execution of an application by the primary computing device 102.

From operation 218, the method 200 proceeds to operation 220, wherein the screen management system 110 propagates the web containers to the devices. In this manner, the physical displays of the devices connected to the multi-screen session show the content of the web container for the associated device. For example, if a screen associated with the auxiliary device 108 is configured to present a particular application executed by the primary computing device 102, a web container associated with the auxiliary device 108 would be created to include content associated with that application. From operation 220, the method proceeds to operation 222. The method 200 may end at operation 222.

Figure 3:
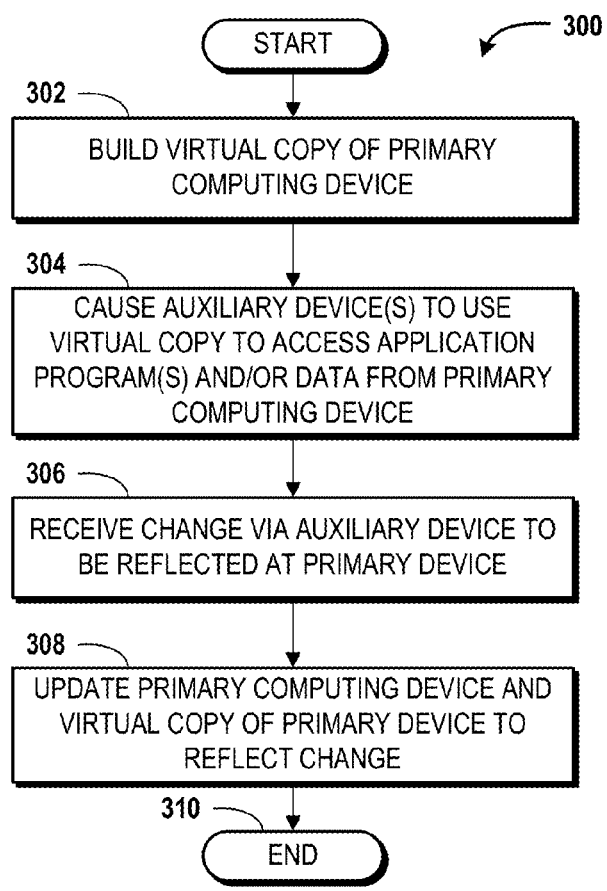
FIG. 3 is a flow diagram illustrating aspects of a method for building a virtual copy of a primary computing device, according to an illustrative embodiment.

Turning now to FIG. 3, a flow diagram illustrating aspects of method 300 for building a virtual copy of the primary computing device 102 will be described, according to an illustrative embodiment. The method 300 begins and proceeds to operation 302, wherein the screen management system 110 builds a virtual copy of the primary computing device 102. A virtual copy can include one or more application programs installed on the primary computing device 102, data stored on the primary computing device 102, or both. In some embodiments, only a subset of the data stored on the primary computing device 102 is made available by the operating system of the primary computing device 102. In these embodiments, the virtual copy is built using the available data. In some embodiments, instead of copying an application program, an emulated version of the application program is used by the screen management system 110. In these embodiments, the application name and version specifications may be used to determine the correct application for emulation. A screen management account can include permissions that a user can set to allow or deny the screen management system 110 access to certain data and/or application programs stored on the primary computing device 102 for the purpose of building a virtual copy and/or for other purposes.

In some embodiments, the operation of building a virtual copy of the primary computing device 102 is initiated when a user first signs in to and/or creates a screen management account associated with the primary computing device 102. In some embodiments, the operation of building a virtual copy of the primary computing device 102 is performed over time when the primary computing device 102 is in communication with the screen management system 110.

From operation 302, the method 300 proceeds to operation 304, wherein the screen management system 110 causes the auxiliary device 108 (or other device connected to a multi-screen computing session) to use the virtual copy to access one or more application programs and/or data available from the primary computing device 102 without having to communicate with the primary computing device 102. From operation 304, the method 300 proceeds to operation 306, wherein the screen management system 110 receives a change to an application program and/or data contained within the virtual copy of the primary computing device 102. At operation 308, the screen management system 110 updates the primary computing device 102 and the virtual copy of the primary computing device 102 to reflect the change received at operation 306. The method 300 then proceeds to operation 310, wherein the method 300 may end.

Figure 4:
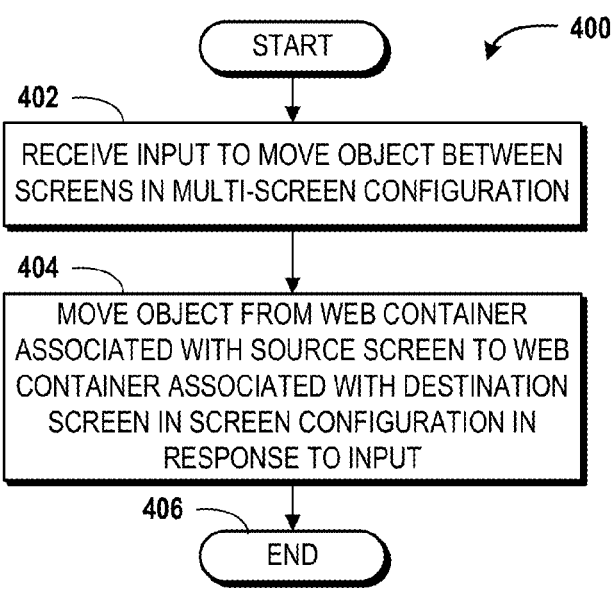
FIG. 4 is a flow diagram illustrating aspects of a method for handling movement of an object between screens in a multi-screen configuration, according to an illustrative embodiment.

Turning now to FIG. 4, a flow diagram illustrating aspects of method 400 for handling movement of an object between screens in a multi-screen configuration will be described, according to an illustrative embodiment. The method 400 begins and proceeds to operation 402, wherein the screen management system 110 receives an input to move an object presented on one screen in the multi-screen configuration to another screen. In response, at operation 404, the screen management system 110 moves the object from the web container associated with the source screen to the web container associated with the destination screen. From operation 404, the method 400 proceeds to operation 406, wherein the method 400 may end.

Figure 5:
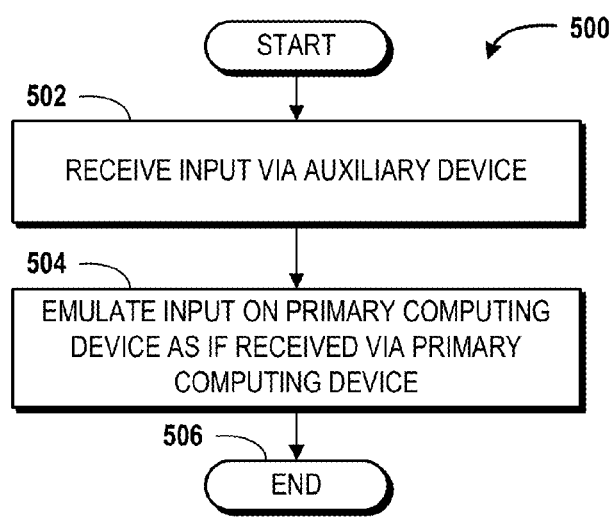
FIG. 5 is a flow diagram illustrating aspects of a method for handling input received via an auxiliary device in a multi-screen configuration, according to an illustrative embodiment.

Turning now to FIG. 5, a flow diagram illustrating aspects of a method 500 for handling input received via the auxiliary device 108 in a multi-screen configuration will be described, according to an illustrative embodiment. The method 500 begins and proceeds to operation 502, wherein the screen management system 110 receives an input via the auxiliary device 108. In response, at operation 504, the screen management system 110 emulates the input on the primary computing device 102 as if the input was received directly via the primary computing device 102. From operation 504, the method 500 proceeds to operation 506, wherein the method 500 may end.

Figure 6A:
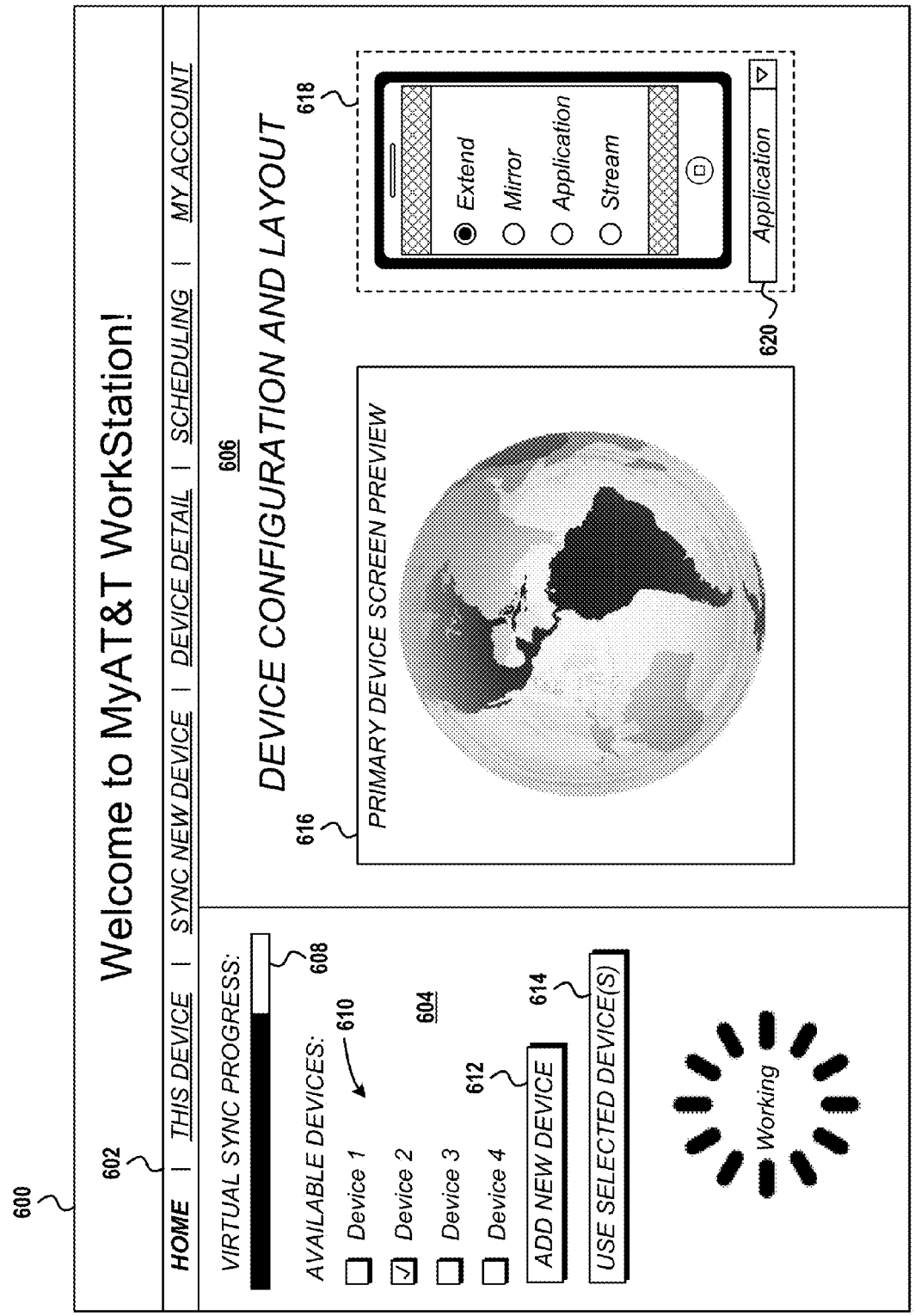
FIGS. 6A-6G are user interface diagrams illustrating aspects of a user interface for various concepts disclosed herein.

FIGS. 6A-6G are user interface diagrams illustrating aspects of a user interface 600. Turning first to FIG. 6A, the user interface 600 is shown with a menu 602 that includes a "home" section, a "this device" section, a "sync new device" section, a "device detail" section, a "scheduling" section, and a "my account" section. Each of these sections will be described in greater detail herein. As illustrated in FIG. 6A, the "home" section has been selected, thereby causing a left pane 604 and a right pane 606 to be populated with various information and interactive elements. In particular, the left pane 604 includes a synchronization progress bar 608 that is used to identify the progress of a virtual copy building process that is currently being performed for a device, such as the primary computing device 102. The left pane 604 also includes an available device list 610 that is illustrated as being populated with four available devices. The left pane 604 also includes an add new device 612 button that, upon selection, allows a user to add a new device to the available device list 610, and a use selected device(s) button 614 that, upon selection, allows a user to use one or more devices that are selected in the available device list 610 in a multi-screen computing session.

The right pane 606 is illustrated in a device configuration and layout mode that provides a device screen preview 616 and a layout selection interface 618. The device screen preview 616 is shown with a preview of a screen associated with the primary computing device 102, such as what would be displayed on the display device 106 in the current selected configuration. Similarly, upon selection of another device from the available device list 610, a preview of that device can be shown in the device screen preview 616. It is contemplated that multiple device screen previews 616 can be presented in the user interface 600 to allow the user to preview what will be presented in each screen.

In the illustrated example, the layout selection interface 618 includes layout selection options for extended layout, mirrored layout, application specific layout, and stream layout. The illustrated layout selection interface 618 also includes an application selection menu 620 that allows for the selection of the application to be used in an application specific or stream layout.

Figure 6B:
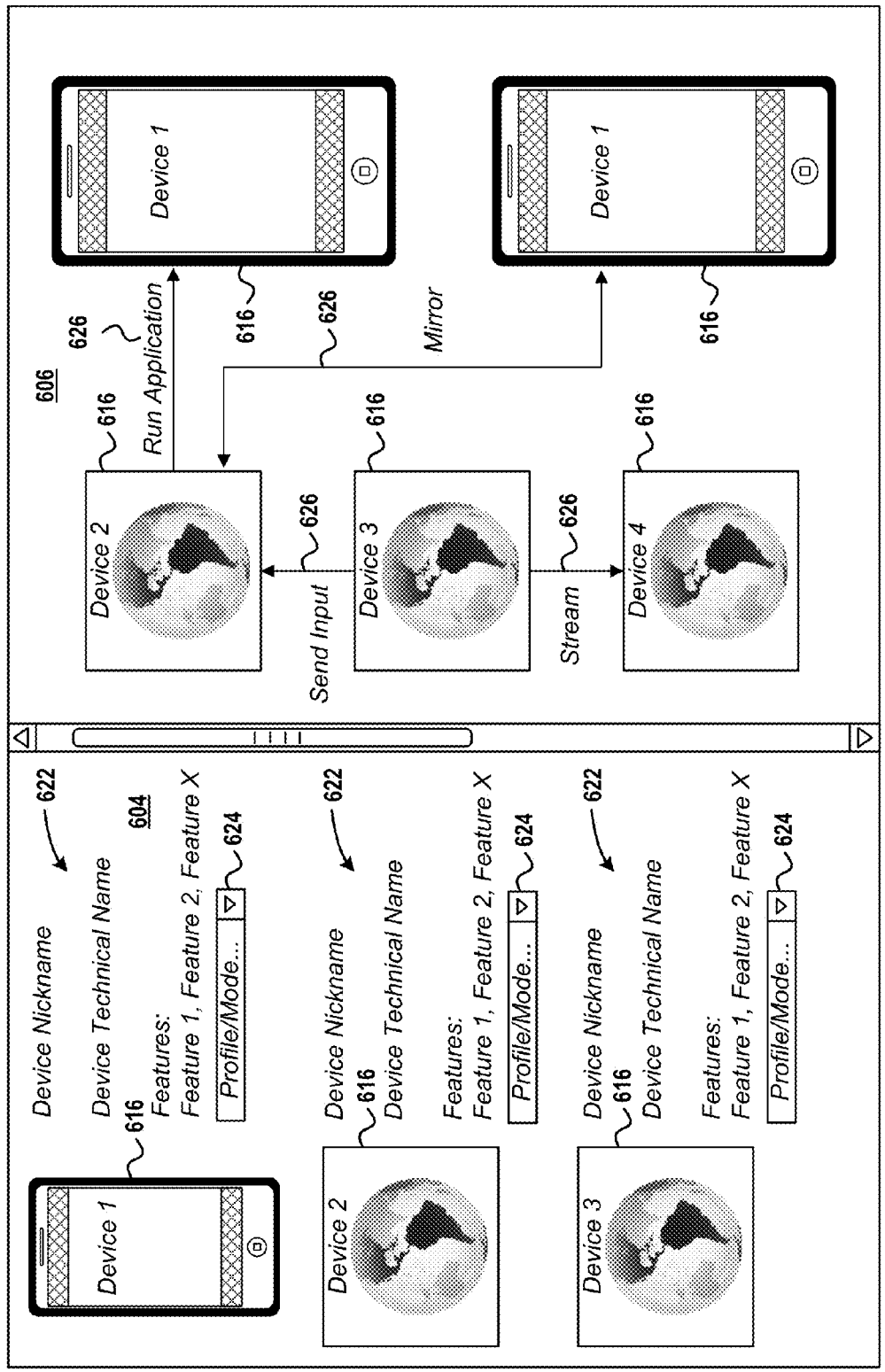

Turning now to FIG. 6B, another view of the device configuration and layout mode is illustrated. In particular, the left pane 604 is populated with device screen previews 616 for available devices. Each of these device screen previews 616 is associated with device information 622 that identifies a device nickname (if applicable), a device technical name such as a make and model of the device, and features provided by the device. In this example, the left pane 604 also includes a profile selection menu 624 for each device. The profile selection menu 624 allows a user to select a profile for the corresponding device. Profiles are described in greater detail below with reference to FIGS. 6C and 6E.

The right pane 606 illustrated in FIG. 6B includes device screen previews 616 for four devices and a configuration among these devices provided by a plurality of connectors 626 to indicate relationships between the devices represented by the device screen previews 616. For example, a "device 3" is shown as being configured to send input to a "device 2" that, in turn, is configured to run an application and mirror what is shown on a "device 1." The "device 3" is also shown as streaming content to a "device 4." In some embodiments, the connectors 626 are added through a drag-and-drop interface whereby a user can select a connector from a menu of connectors and place the connector between devices to define a multi-screen configuration. Although connectors for "run application," "send input," "stream," and "mirror" are shown, other connectors to implement other functionality for a multi-screen configuration are contemplated. As such, the illustrated multi-screen configuration should not be construed as limiting in any way.

Figure 6C:
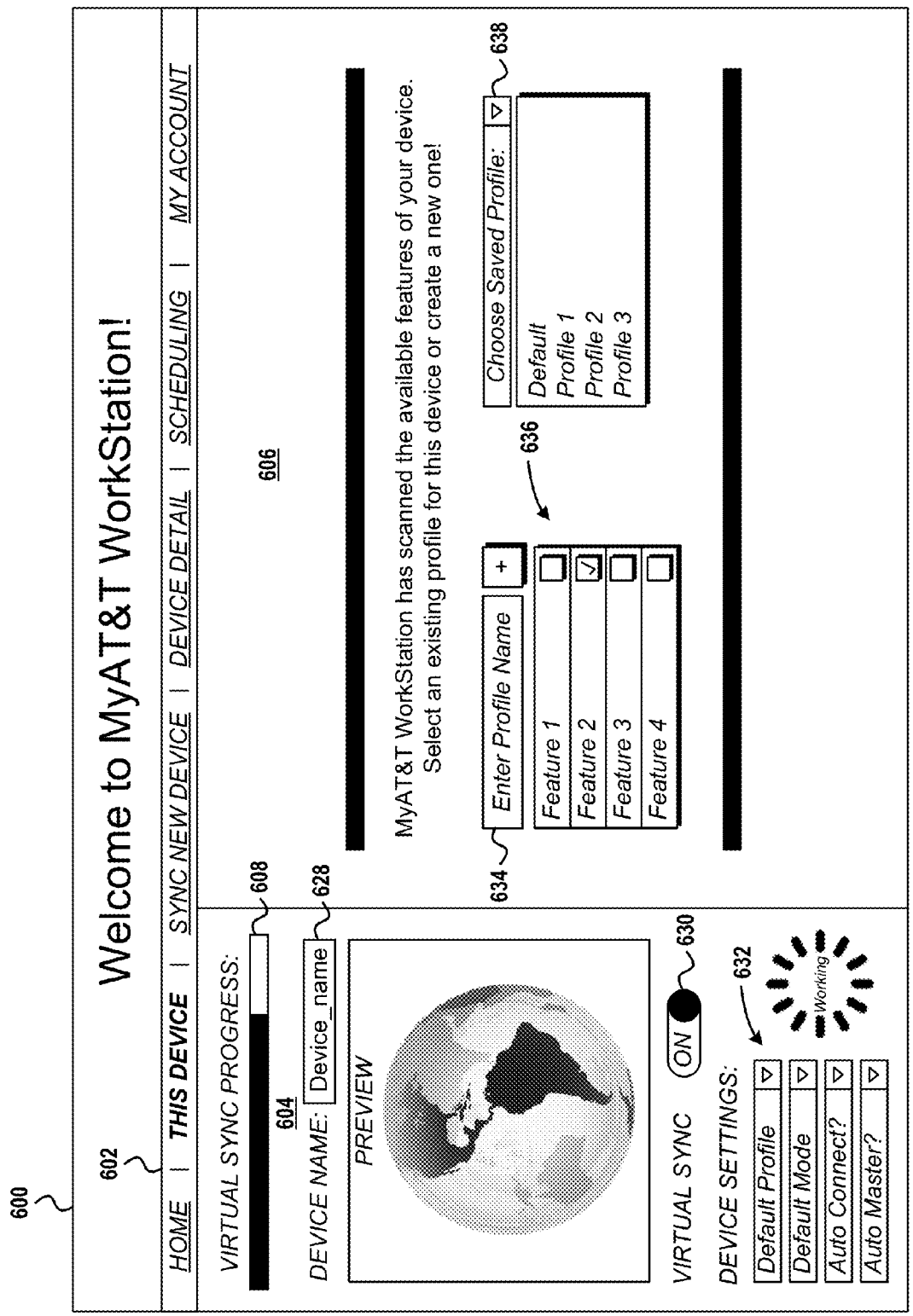

Turning now to FIG. 6C, the "this device" section of the menu 602 has been selected, thereby causing the left pane 604 and the right pane 606 to be populated with various information and interactive elements. In particular, the left pane 604 includes the synchronization progress bar 608, a device name box 628 that shows the current device nickname for the selected device. The device name box 628 may allow input to customize the device nickname for the selected device. The left pane 604 also includes a virtual sync toggle button 630 that, upon selection, toggles the virtual copy building process ON/OFF. Also included in the left pane 604 in this example is a device settings menu 632 through which a user can view the current device settings for the selected device. The illustrated device settings menu 632 allows the current device settings to be changed.

The right pane 606 in FIG. 6C is illustrated as including a profile entry interface 634, a feature selection interface 636, and a saved profile selection interface 638. The profile entry interface 634 allows a user to create a new profile. A user may alternatively select a saved profile via the saved profile selection interface 638. A profile identifies one or more features that are to be made available via a corresponding device when selected. Features may include, but are not limited to, input features, output features, connectivity features, and/or multimedia features of a device.

In the illustrated embodiment, the selected device is scanned for available features that are then populated in the feature selection interface 636. The feature selection interface 636 allows a user to select one or more features that are to be made available via the selected device when the new profile is chosen.

Figure 6D:
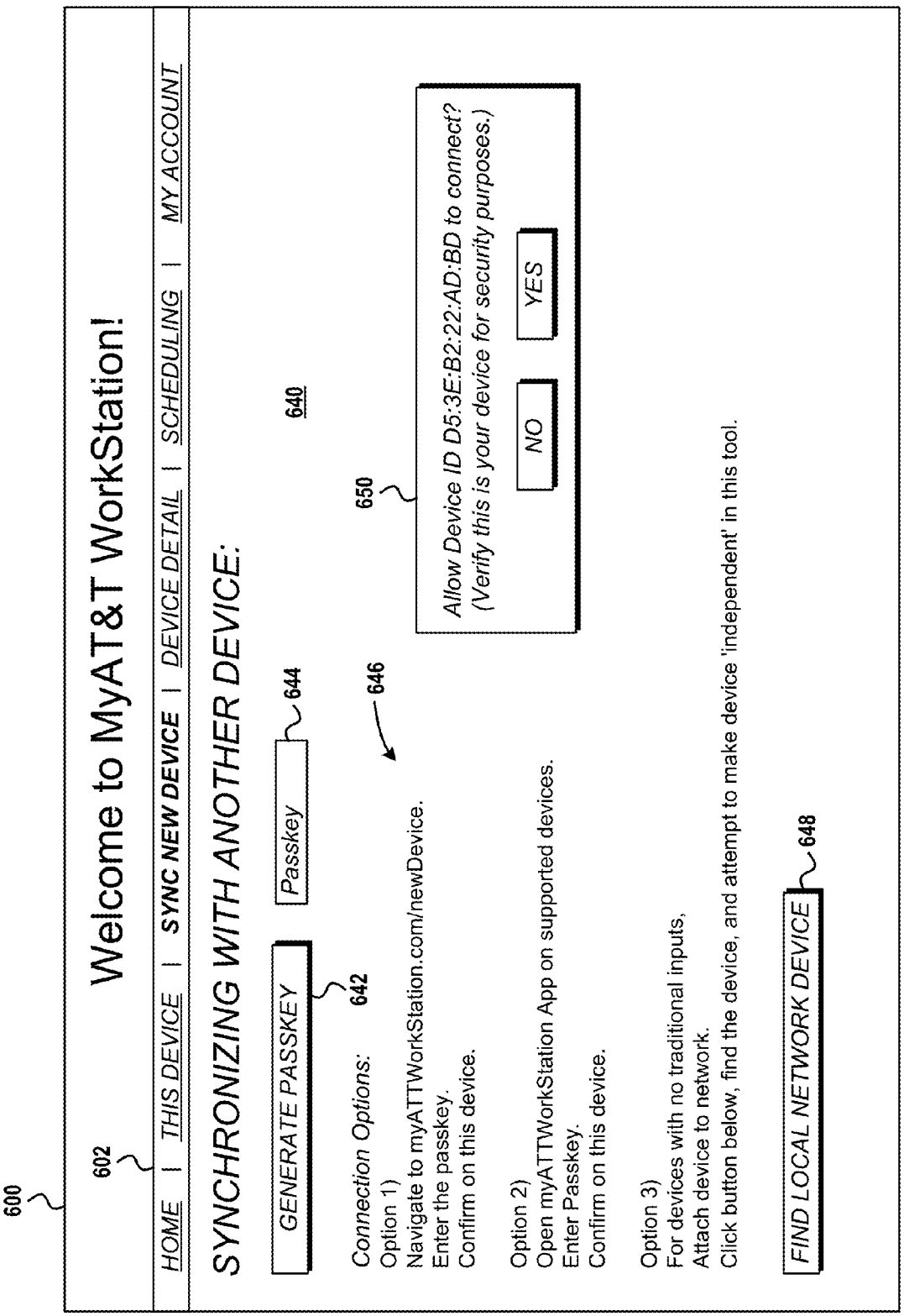

Turning now to FIG. 6D, the "sync new device" section of the menu 602 has been selected, thereby causing a synchronization interface 640 to be presented within the user interface 600. In the illustrated example, the synchronization interface 640 includes a generate passkey button 642, a passkey display box 644, a connection options listing 646, a find local network device button 648, and a confirmation dialog box 650.

The generate passkey button 642, upon selection, generates a passkey for use in securely connecting a new device to the screen management system 110. The passkey display box 644 presents a passkey generated in response to a selection of the generate passkey button 642.

The connection options listing 646 provides guidance to the user in regards to how to connect a new device to the screen management system 110. It should be understood that the illustrated connection options merely illustrative of possible connection options. As such, the connection options illustrated in the connection options listing 646 should not be construed as limiting.

The find local network device button 648, upon selection, searches for devices on the same network as the device that has accessed the user interface 600. For example, if a user accesses the user interface 600 through a web browser of the primary computing device 102 and selects the find local network device button 648, a search will be conducted for other devices connected to the same local network as the primary computing device 102. The user may then select a device found in the search to connect that device to the screen management system 110.

The confirmation dialog box 650 provides a device ID such as a MAC address or other device ID described herein above to identify a device that is trying to connect to the screen management system 110. The confirmation dialog box 650 also includes a yes option and a no option to allow or deny connection, respectively, to the device identified by the device ID.

Figure 6E:
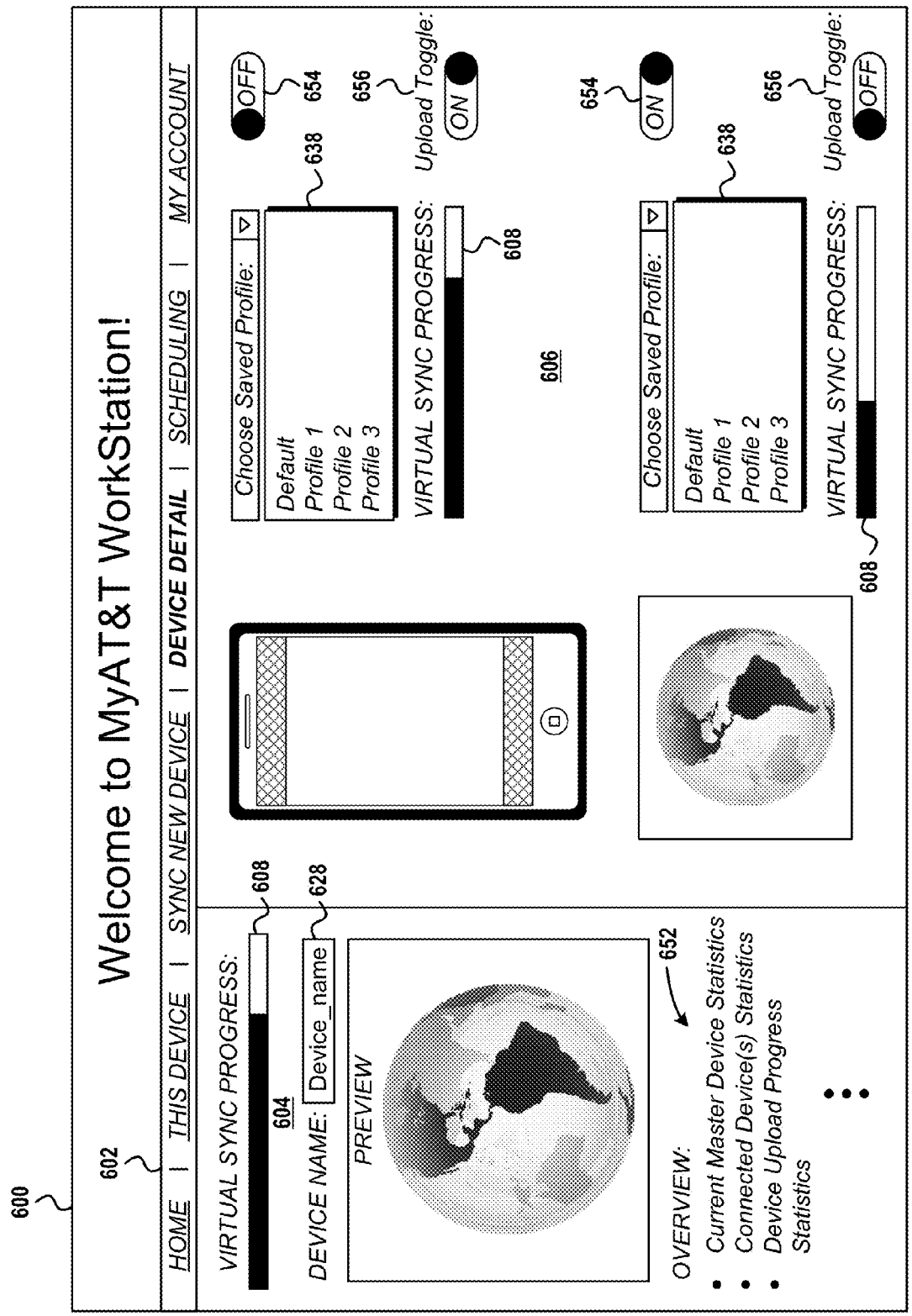

Turning now to FIG. 6E, the "device detail" section of the menu 602 has been selected, thereby causing the left pane 604 and the right pane 606 to be populated with various information and interactive elements. In particular, the left pane 604 includes the synchronization progress bar 608. The left pane 604 also includes the device name box 628 that shows the current device nickname for the selected device. The left pane 604 also includes an overview 652 of the selected device.

The right pane 606 in FIG. 6E provides a dashboard of all devices that have ever been associated with the active screen management account. In the illustrated example, two devices are shown, each with an instance of the saved profile selection interface 638, an instance of the synchronization progress bar 608, an active toggle button 654, and an upload toggle button 656. The active toggle button, upon selection, toggles an active state of the associated device ON/OFF. The upload toggle button, upon selection, toggles whether to continue uploading data from the associated device when the associated device is not being used to provide a screen for a multi-screen computing session.

Figure 6F:
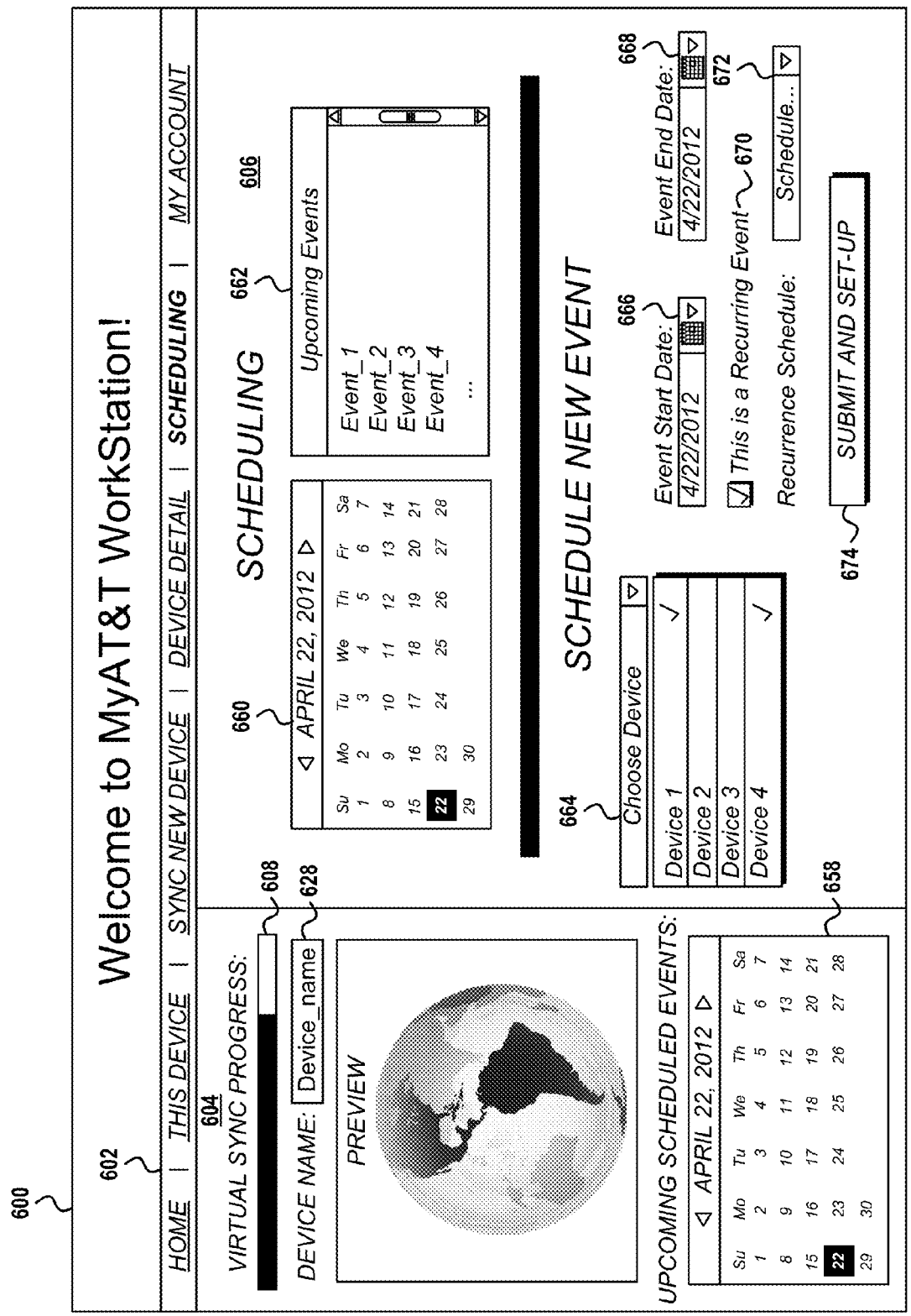

Turning now to FIG. 6F, the "scheduling" section of the menu 602 has been selected, thereby causing the left pane 604 and the right pane 606 to be populated with various information and interactive elements. In particular, the left pane 604 includes the synchronization progress bar 608, the device name box 628, and an upcoming scheduled events calendar 658. The upcoming scheduled events calendar 658 shows any upcoming events for the selected device.

The right pane 606 illustrated in FIG. 6F provides a scheduling interface that includes a master upcoming scheduled events calendar 660, a master upcoming events list 662, a device selection interface 664, an event start date menu 666, an event end date menu 668, a recurring event checkbox 670, a recurrence schedule menu 672, and a submit and set-up button 674. The master upcoming scheduled events calendar 660 shows any upcoming events for all devices associated with the active screen management account. The master upcoming events list 662 shows a list of any upcoming events for all devices associated with the active screen management account. The device selection interface 664 allows a user to select a device for which to schedule a new event. The event start date menu 666 allows a user to choose a start date for the new event. The event end date menu 668 allows a user to choose an end date for the new event. The recurring event checkbox 670 allows a user to make the new event a recurring event. The recurrence schedule menu 672 allows a user to select recurrence schedule for the new event. The submit and set-up button 674 allows a user to confirm the new event with the specifications provided through the device selection interface 664, the event start date menu 666, the event end date menu 668, the recurring event checkbox 670, and the recurrence schedule menu 672.

Figure 6G:
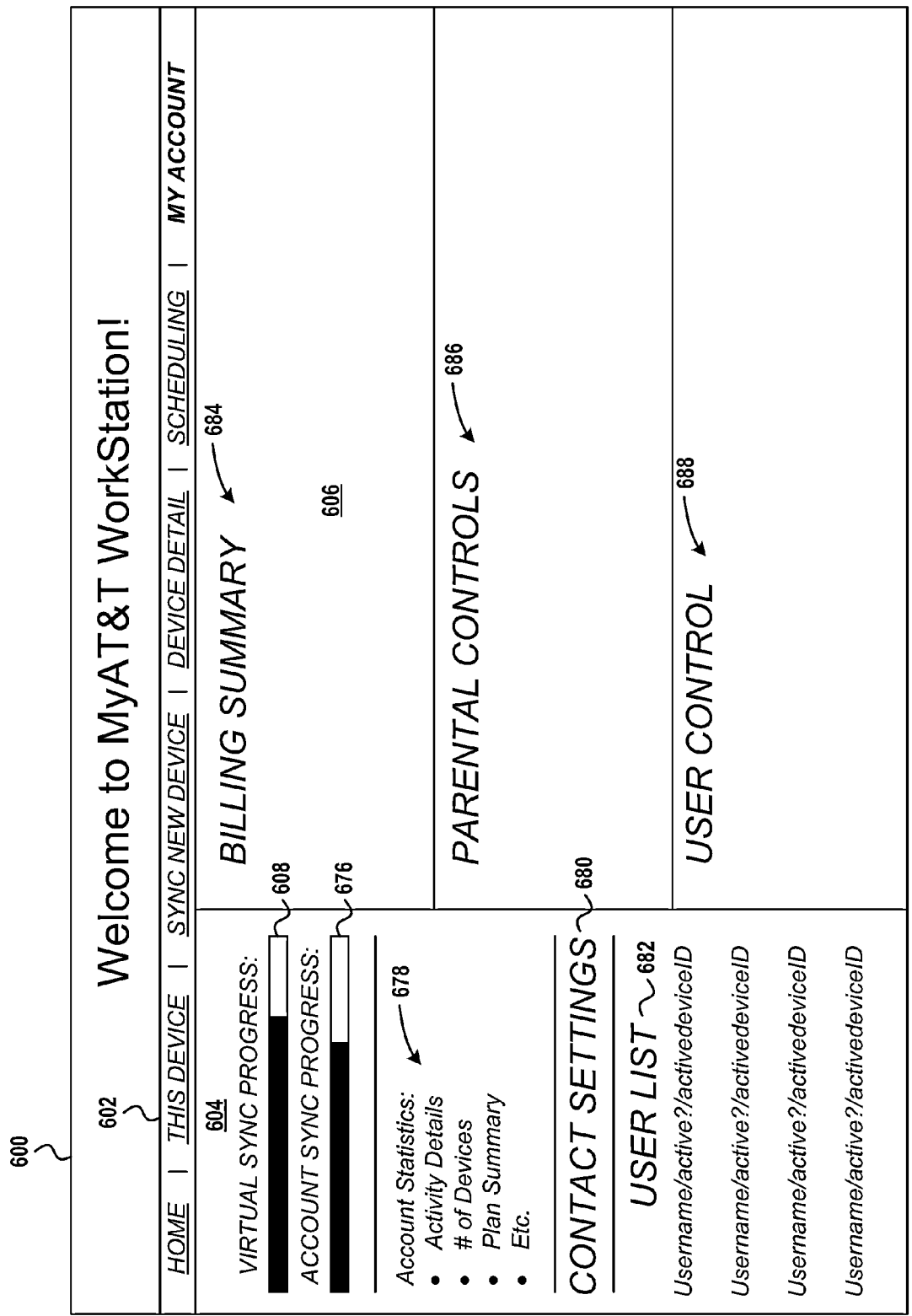

Turning now to FIG. 6G, the "my account" section of the menu 602 has been selected, thereby causing the left pane 604 and the right pane 606 to be populated with various information and interactive elements. In particular, the left pane 604 includes the synchronization progress bar 608, an account synchronization progress bar 676, account statistics 678, contact settings 680, and a user list 682. The account synchronization progress bar 676 shows the progress of a synchronization process for the active screen management account. The account statistics 678 include statistics such as, but not limited to, activity details, number of devices, service plan summary, and/or the like. The contact settings 680 include settings related to a user's contacts. The user list 682 includes a list of all devices that are currently active for the active screen management account.

The right pane 606 illustrated in FIG. 6G provides a billing summary 684, parental controls 686, and user controls 688. The billing summary 684 shows billing details for the active screen management account, if applicable. The parental controls 686 provide one or more options to control the access to one or more devices associated with the active screen management account, to control access to one or more devices at specified times, to control access between specified devices, and to assign devices to specified users. Other parental controls are contemplated. The user controls 688 provide one or more options related to a user's personal preferences.

Figure 7:
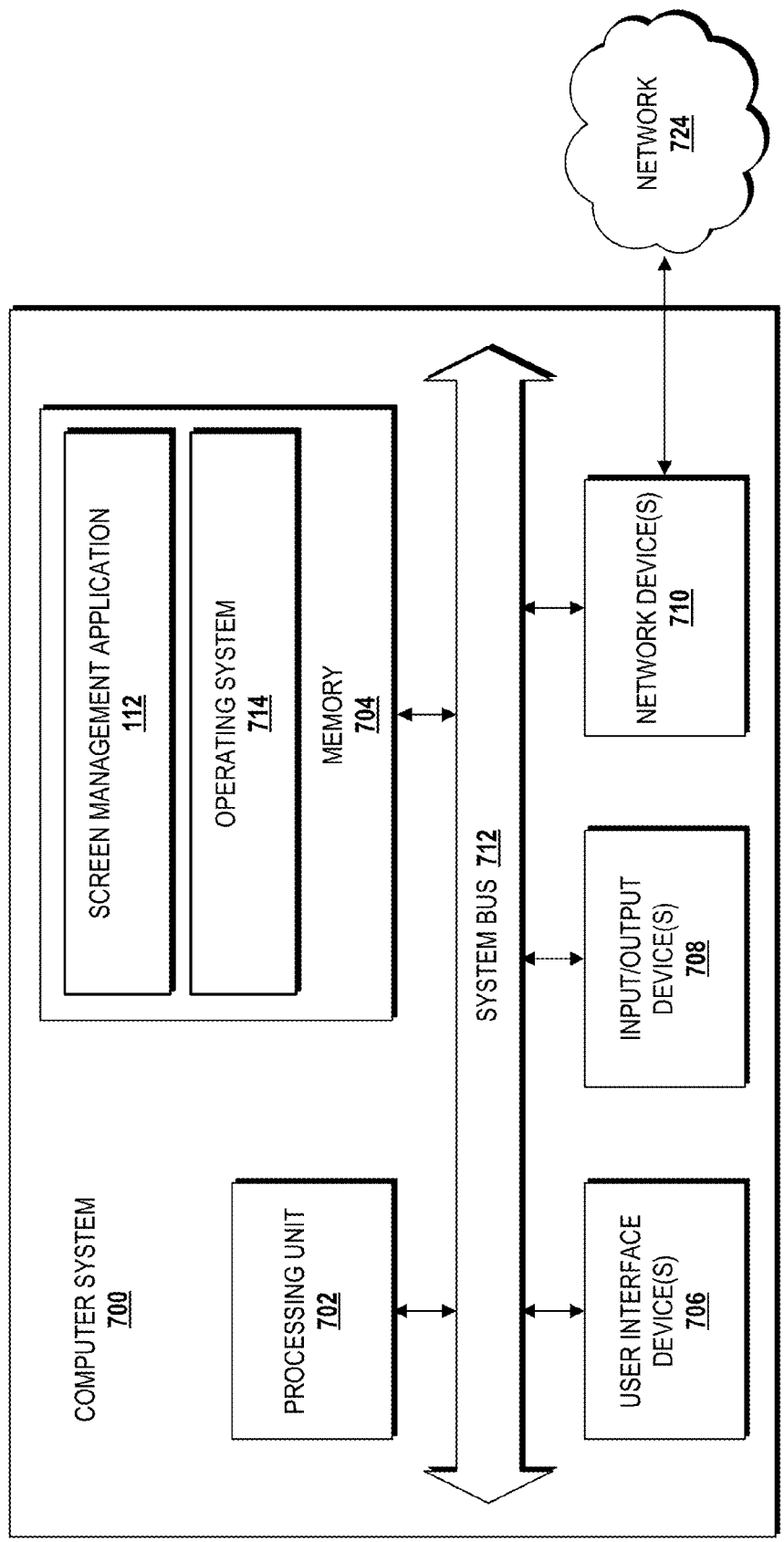
FIG. 7 is a computer architecture diagram illustrating an illustrative computer hardware and software architecture for a computing system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and the screen management application.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 724, such as the internet 104 and/or one or more other networks described herein above with reference to FIG. 1. Examples of the network devices 710 include, but are not limited to, a modem, a radio frequency ("RF") or infrared ("IR") transceiver, a telephonic interface, a bridge, a router, or a network card. The network 724 may include a wireless network such as, but not limited to, a WLAN such as a WI-FI network, a WWAN, a wireless PAN ("WPAN") such as BLUETOOTH, or a wireless MAN ("WMAN"). Alternatively, the network 724 may be a wired network such as, but not limited to, a WAN such as the Internet, a LAN such as the Ethernet, a wired PAN, or a wired MAN.

The network 724 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 724. Therefore, the embodiments presented herein should not be construed as being limited to a particular mobile telecommunications technology and/or standards utilizing such technologies.

Figure 8:
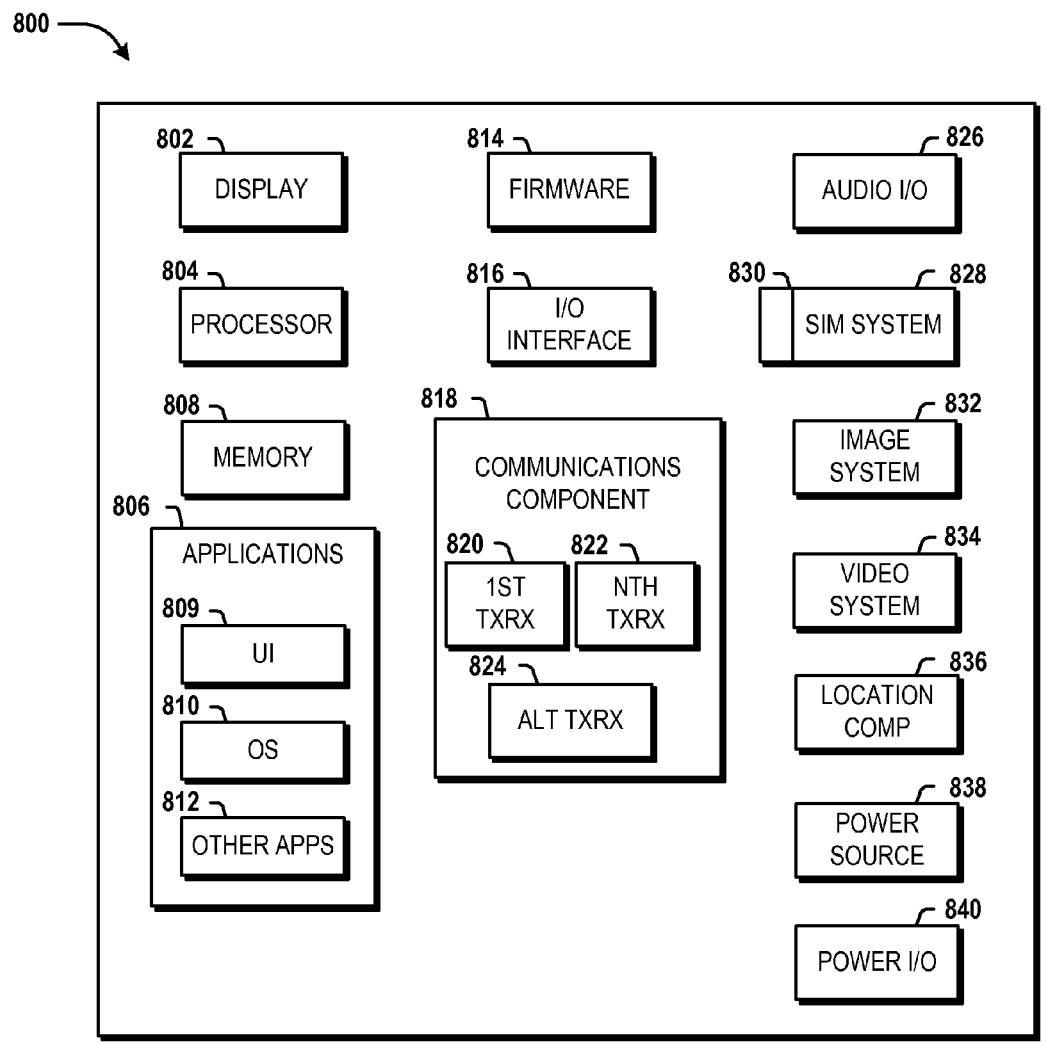
FIG. 8 is a mobile device architecture diagram illustrating an illustrative mobile device hardware and software architecture for a mobile device capable of implementing aspects of the embodiments disclosed herein.

Turning now to FIG. 8, an illustrative mobile device 800 and components thereof will be described. Although connections are not shown between the components illustrated in FIG. 8, the components can interact with each other to carry out device functions. In some embodiments, for example, the components are arranged so as to communicate via one or more busses (not shown). It should be understood that FIG. 8 and the following description are intended to provide a general understanding of a suitable environment in which various aspects of embodiments can be implemented. The primary computing device 102 and/or the auxiliary device 108 described herein above may be configured like the mobile device 800. It should be understood that the primary computing device 102 and/or the auxiliary device 108 may include additional functionality or include less functionality than now described.

As illustrated in FIG. 8, the mobile device 800 includes a display 802 for displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 800 also includes a processor 804 for processing data and/or executing computer-executable instructions of one or more applications 806 stored in a memory 808. In some embodiments, the applications 806 include a UI application 809. The UI application 809 interfaces with an operating system ("OS") application 810 to facilitate user interaction with device functionality and data. In some embodiments, the OS application 810 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

The UI application 809 aids a user in entering message content, viewing received messages, answering/initiating calls, entering/deleting data, entering and setting user IDs and passwords for device access, configuring settings, manipulating address book content and/or settings, multimode interaction, interacting with other applications 812, and otherwise facilitating user interaction with the OS application 810, and the other applications 812.

In some embodiments, the other applications 812 include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 806 or portions thereof are stored in the memory 808 and/or in a firmware 814, and are executed by the processor 804. The firmware 814 may also store code for execution during device power up and power down operations.

The mobile device 800 also includes an input/output ("I/O") interface 816 for the input/output of data such as location information, presence status information, user IDs, passwords, and application initiation (start-up) requests. In some embodiments, the I/O interface 816 is a hardwire connection such as a universal serial bus ("USB"), mini-USB, micro-USB, audio jack, PS2, IEEE 1394, serial, parallel, Ethernet (RJ45) port, RJ11 port, proprietary port, combinations thereof, or the like. In some embodiments, the mobile device 800 is configured to synchronize with another device (e.g., a computer) to transfer content stored to/from the mobile device 800. In some embodiments, the mobile device 800 is configured to receive updates to one or more of the applications 806 via the I/O interface 816. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device instead of, or in addition to, a communications component 818.

The communications component 818 interfaces with the processor 804 to facilitate wireless communications with one or more networks such as those described above with reference to FIG. 1. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers each configured to communicate over the same or a different wireless technology standard. For example, the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like. In addition, the communications component 818 may facilitate data communications using GPRS, EDGE, the HSPA protocol family including HSDPA, EUL or otherwise termed HSUPA, HSPA+, and various other current and future wireless data access standards.

In the illustrated embodiment, the communications component 818 includes a first cellular transceiver 820 that operates in one mode (e.g., GSM), and an $N^{th}$ cellular transceiver 822 operates in a different mode (e.g., UMTS). While only two cellular transceivers 820, 822 are illustrated, it should be appreciated that more than two transceivers can be included in the communications component 818.

The illustrated communications component 818 also includes an alternative communications transceiver 824 for use by other communications technologies including WI-FI, WIMAX, BLUETOOTH, infrared, infrared data association ("IRDA"), near field communications ("NFC"), other RF, combinations thereof, and the like. In some embodiments, the communications component 818 also facilitates reception from terrestrial radio networks, digital satellite radio networks, internet-based radio service networks, combinations thereof, and the like.

The communications component 818 processes data from a network such as an internet, an intranet, a home broadband network, a WI-FI hotspot, and the like, via an internet service provider ("ISP"), digital subscriber line ("DSL") provider, or broadband provider.

Audio capabilities for the mobile device 800 may be provided by an audio I/O component 826 that includes a speaker for the output of audio signals and a microphone to collect audio signals.

The illustrated mobile device 800 also includes a USIM system 828 that includes a SIM slot interface 830 for accommodating a USIM card. In some embodiments, the USIM system 828 is configured to accept insertion of other SIM cards for access to other network types such as GSM. In other embodiments, the USIM system 828 is configured to accept multiple SIM cards. In still other embodiments, the USIM system 828 is configured to accept a universal integrated circuit card ("UICC") with one or more SIM applications stored thereupon.

The mobile device 800 may also include an image capture and processing system 832 ("image system"). Photos may be obtained via an associated image capture subsystem of the image system 832, for example, a camera. The mobile device 800 may also include a video system 834 for capturing, processing, recording, and/or modifying video content. Photos and videos obtained using the image system 832 and the video system 834, respectively, may be added as message content to an MMS message and sent to another mobile device.

The illustrated mobile device 800 also includes a location component 836 for sending and/or receiving signals such as GPS data, assisted-GPS data, WI-FI/WIMAX and/or cellular network triangulation data, combinations thereof, and the like, for determining a location of the mobile device 800. The location component 836 may communicate with the communications component 818 to retrieve triangulation data for determining a location of the mobile device 800. In some embodiments, the location component 836 interfaces with cellular network nodes, telephone lines, satellites, location transmitters and/or beacons, wireless network transmitters and receivers, combinations thereof, and the like. In some embodiments, the location component 836 includes one or more sensors such as a compass, an accelerometer, and/or a gyroscope to determine the orientation of the mobile device 800. Using the location component 836, the mobile device 800 can generate and/or receive data to identify its location, or transmit data used by other devices to determine the location of the mobile device 800. The location component 836 may include multiple components for determining the location and/or orientation of the mobile device 800.

The illustrated mobile device 800 also includes a power source 838, such as one or more batteries and/or other power subsystem (AC or DC). The power source 838 may interface with an external power system or charging equipment via a power I/O component 840.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system described below with reference to FIG. 7. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

Based on the foregoing, it should be appreciated that concepts and technologies for on-demand multi-screen computing have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A method comprising: receiving, by a screen management system comprising a processor and via a network, a sign-in request from a primary computing device, wherein the primary computing device displays first visual content on a first screen, and wherein the primary computing device displays layout selection options for an extended screen layout and a stream layout;

in response to authenticating the primary computing device using the sign-in request, establishing, by the screen management system, a multi-screen computing session;

receiving, by the screen management system and via the multi-screen computing session, a configuration input from the primary computing device, wherein the configuration input defines a multi-screen configuration that identifies a second screen associated with an auxiliary device to be used as an extended screen for the primary computing device in the multi-screen computing session;

establishing, by the screen management system, communication with the auxiliary device;

creating, by the screen management system, a first web container for the primary computing device and a second web container for the auxiliary device, the second web container comprising a data structure that stores second visual content to be displayed on the second screen; and propagating, by the screen management system and via the network, the second web container to the auxiliary device for presentation of the second visual content at on a display of the auxiliary device.

2. The method of claim 1, further comprising:
presenting, by the screen management system and via the primary computing device, a multi-screen configuration user interface that is used to define the configuration input.

3. The method of claim 1, wherein the configuration input comprises an assignment of a layout to the first screen and the second screen.

4. The method of claim 1, further comprising:
building, by the screen management system, a virtual copy of the primary computing device;
causing, by the screen management system, the auxiliary device to use the virtual copy to access content from the primary computing device without the auxiliary device communicating with the primary computing device;
receiving, by the screen management system, a change that is input via the auxiliary device; and
updating, by the screen management system, the primary computing device and the virtual copy to reflect the change.

5. The method of claim 1, further comprising:
receiving, by the screen management system, an input to move an object from the first screen to the second screen; and
in response to receiving the input, moving the object from the first web container to the second web container.

6. The method of claim 5, wherein the object comprises an application.

7. The method of claim 1, further comprising:
receiving, by the screen management system, an input via the auxiliary device; and
emulating, by the screen management system, the input on the primary computing device.

8. The method of claim 1, wherein receiving the configuration input comprises remoting into the primary computing device and displaying, via the primary computing device, a graphical user interface via which the configuration input is received.

9. A computer-readable storage medium comprising computer-executable instructions that, when executed by a processor, cause the processor to perform operations comprising:
receiving, via a network, a sign-in request from a primary computing device, wherein the primary computing device displays first visual content on a first screen, and wherein the primary computing device displays layout selection options for an extended screen layout and a stream layout;

in response to authenticating the primary computing device using the sign-in request, establishing a multi-screen computing session;

receiving, via the multi-screen computing session, a configuration input from the primary computing device, wherein the configuration input defines a multi-screen configuration that identifies a second screen associated with an auxiliary device to be used as an extended screen for the primary computing device in the multi-screen computing session;

establishing communication with the auxiliary device;

creating a first web container for the primary computing device and a second web container for the auxiliary device, the second web container comprising a data structure that stores second visual content to be displayed on the second screen; and propagating, via the network, the second web container to the auxiliary device for presentation of the second visual content at the auxiliary device.

10. The computer-readable storage medium of claim 9, wherein the computer-executable instructions, when executed by the processor, cause the processor to perform operations further comprising:
presenting, via the primary computing device, a multi-screen configuration user interface that is used to define the configuration input.

11. The computer-readable storage medium of claim 10, wherein the configuration input defines:
an arrangement of the first screen and the second screen within the multi-screen configuration; and
an assignment of a layout to the first screen and the second screen.

12. The computer-readable storage medium of claim 9, wherein the computer-executable instructions, when executed by the processor, cause the processor to perform operations further comprising:
building a virtual copy of the primary computing device;
causing the auxiliary device to use the virtual copy to access content from the primary computing device, without the auxiliary device communicating with the primary computing device;
receiving a change that is input via the auxiliary device; and
updating the primary computing device and the virtual copy to reflect the change.

13. The computer-readable storage medium of claim 9, wherein the computer-executable instructions, when executed by the processor, cause the processor to perform operations further comprising:
receiving an input to move an object from the first screen to the second screen; and
in response to receiving the input, moving the object from the first web container to the second web container.

14. The computer-readable storage medium of claim 9, wherein the computer-executable instructions, when executed by the processor, cause the processor to perform operations further comprising:
receiving an input via the auxiliary device; and emulating the input on the primary computing device.

15. A screen management system, comprising:
a processor; and
a memory that stores computer-executable instructions that, when executed by the processor, cause the processor to perform operations comprising:

receiving, via a network, a sign-in request from a primary computing device, wherein the primary computing device displays first visual content on a first screen, and wherein the primary computing device displays layout selection options for an extended screen layout and a stream layout, in response to authenticating the primary computing device using the sign-in request, establishing a multi-screen computing session, establishing communication with an auxiliary device, creating a first web container for the primary computing device and a second web container for the auxiliary device, the second web container comprising a data structure that stores second visual content to be displayed on a second screen associated with the auxiliary device; and propagating, via the network, the second web container to the auxiliary device for presentation of the second visual content at the auxiliary device.

16. The screen management system of claim 15, wherein the computer-executable instructions, when executed by the processor, cause the processor to perform operations further comprising:

presenting, via the primary computing device, a multi-screen configuration user interface that is used to define a configuration input, wherein the configuration input defines:

an arrangement of the first screen and the second screen within a multi-screen configuration, and an assignment of a layout to the first screen and the second screen.

17. The screen management system of claim 15, wherein the computer-executable instructions, when executed by the processor, cause the processor to perform operations further comprising:

receiving an input to move an object from the first screen to the second screen; and in response to receiving the input, moving the object from the first web container to the second web container.

18. The screen management system of claim 15, wherein the computer-executable instructions, when executed by the processor, cause the processor to perform operations further comprising:

receiving an input via the auxiliary device; and emulating the input on the primary computing device.

* * * * *